(12) United States Patent
Giladi (10) Patent No.: US 9,992,250 B2
(45) Date of Patent: Jun. 5, 2018

(54) CARRIAGE OF ISO-BMFF EVENT BOXES IN AN MPEG-2 TRANSPORT STREAM

(71) Applicant: Futurewei Technologies, Inc., Plano, TX (US)

(72) Inventor: Alexander Giladi, Princeton, NJ (US)

(73) Assignee: Futurewei Technologies, Inc., Plano (*) Notice: Subject to any disclaimer, the term of this patent is extended or adjusted under 35 U.S.C. 154(b) by 126 days.

(21) Appl. No.: 13/973,759

(22) Filed: Aug. 22, 2013

(65) Prior Publication Data

US 2014/0059180 A1 Feb. 27, 2014

Related U.S. Application Data

(60) Provisional application No. 61/692,099, filed on Aug. 22, 2012.

(51) Int. Cl.
*H04L 29/06* (2006.01)
*H04N 21/2343* (2011.01)
*H04N 21/236* (2011.01)
*H04N 21/2362* (2011.01)
*H04N 21/61* (2011.01)
*H04N 21/845* (2011.01)

(52) U.S. Cl.
CPC ....... *H04L 65/602* (2013.01); *H04N 21/2362* (2013.01); *H04N 21/23439* (2013.01); *H04N 21/23611* (2013.01); *H04N 21/6125* (2013.01); *H04N 21/8456* (2013.01)

(58) Field of Classification Search
CPC ............ H04L 65/602; H04N 21/23439; H04N 21/23611

USPC .......................................................... 709/219
See application file for complete search history.

(56) References Cited

U.S. PATENT DOCUMENTS

| 5,381,181 | A | 1/1995 | Deiss |
| 6,172,988 | B1 | 1/2001 | Tiernan et al. |
| 8,879,893 | B2 * | 11/2014 | Gravoille ...................... 386/258 |
| 2006/0064760 | A1 | 3/2006 | Eyer et al. |
| 2008/0259878 | A1 * | 10/2008 | Connors ............. H04W 72/005 370/336 |
| 2008/0259879 | A1 | 10/2008 | Connors et al. |
| 2009/0271832 | A1 * | 10/2009 | Park et al. ....................... 725/98 |
| 2012/0233345 | A1 * | 9/2012 | Hannuksela .................. 709/231 |
| 2014/0208378 | A1 | 7/2014 | Emura |

(Continued)

FOREIGN PATENT DOCUMENTS

| CN | 1395426 A | 2/2003 |
| CN | 101150383 A | 3/2008 |
| CN | 101156465 A | 4/2008 |

(Continued)

OTHER PUBLICATIONS

ISO/IEC 23009-1:2012, "Information Technology—Dynamic Adaptive Streaming over HTTP (DASH)—Part 1: Media Presentation Description and Segment Formats," Jan. 2012, 133 pgs.

(Continued)

*Primary Examiner* — Ranodhi Serrao
(74) *Attorney, Agent, or Firm* — Futurewei Technologies, Inc.

(57) ABSTRACT

A method of media streaming implemented by a network device, the method comprising encapsulating a message box into one or more packets in a segment, and sending the segment directly or indirectly to a streaming client.

18 Claims, 5 Drawing Sheets

(56) References Cited

U.S. PATENT DOCUMENTS

2014/0289802 A1   9/2014   Lee et al.

FOREIGN PATENT DOCUMENTS

| | | |
|---|---|---|
| CN | 101682410 A | 3/2010 |
| CN | 102546112 A | 7/2012 |
| EP | 1049336 A2 | 11/2000 |
| JP | 2000504181 A | 4/2000 |
| JP | 2006528440 A | 12/2006 |
| JP | 2010093831 A | 4/2010 |
| JP | 2013511196 A | 3/2013 |
| KR | 20090112438 A | 10/2009 |
| KR | 20110053177 A | 5/2011 |
| WO | 0106688 A1 | 1/2001 |
| WO | 2004114676 A1 | 12/2004 |
| WO | 2011059273 A2 | 5/2011 |
| WO | 2012032502 A1 | 3/2012 |

OTHER PUBLICATIONS

ISO/IEC 23009-4:2013, "Information Technology—Dynamic Adaptive Streaming over HTTP (DASH)—Part 4: Segment Encryption and Authentication," 2013, 34 pgs.

ISO/IEC FDIS 23001-7:2011, "Information Technolog—MEPG Systems and Technologies—Part 7: Common Encryption in ISO Base Media File Format Files," Jul. 2011, 15 pgs.

ISO/IEC 14496-12, "Information Technology—Coding of Audio-Visual Objects—Part 12: ISO Base Media File Format," 2012, 196 pgs.

ISO/IEC JTC 1/SC 29, "Information Technology—Dynamic Adaptive Streaming over HTTP (DASH)—Part 1: Media Presentation Description and Segment Formats, Technical Corrigendum 1," Aug. 2012, 36 pgs.

ANSI/SCTE 35 2007, "Digital Program Insertion Cueing Message for Cable," Society of Cable Telecommnications Engineers, Engineering Committee, Digital Video Subcommittee, American National Standard, 2007, 42 pgs.

Series H: "Audiovisual and Multimedia Systems, Infrastructure of Audiovisual Services—Transmission Multiplexing and Synchronization," "Informational Technology—Generic Coding of Moving Pictures and Associated Audio Information: Systems," ITU-T Telecommunication Standardization Sector of ITU, H.222.0, May 2012, 234 pgs.

ISO/IEC 23009-1:2012/Amd.1:2013, "Information Technology—Dynamic Adaptive Streaming over HTTP (DASH)—Part 1: Media Presentation Description and Segment Formats, Amendment 1," 2013, 47 pgs.

"Information technology—Dynamic adaptive streaming over HTTP (DASH)—Part 4: Segment encryption and authentication," International Standard, ISO/IEC 23009-4, Jul. 1, 2013, 32 pages.

Foreign Communication From a Counterpart Application, PCT Application No. PCT/US2013/056251, International Search Report dated Nov. 11, 2013, 5 pages.

Foreign Communication From a Counterpart Application, PCT Application No. PCT/US2013/056251, Written Opinion dated Nov. 11, 2013, 8 pages.

Hughes, K., et al., "Asynchronous Event Handling in DASH," International Organisation for Standardisation, Coding of Moving Pictures and Audio, ISO/IEC JTC1/SC29/WG11 MPEG2012/m24717, Geneva, Switzerland, Apr. 2012, 8 pages.

Giladi, A., et al., "Carriage of DASH Asynchronous Event Boxes in MPEG-2 TS," International Organisation for Standardisation, Coding of Moving Pictures and Audio, ISO/IEC JTC1/SC29/WG11 MPEG2012/M26367, Shanghai, China, Oct. 2012, 3 pages.

"Overview of MPEG-2 Systems," Technologies and Services on Digital Broadcasting (5), Broadcast Technology, No. 11, Summer 2002, 8 pages.

"Information Technology—Dynamic Adaptive Streaming over HTTP (DASH)—Part 1: Media Presentation Description and Segment Formats," ISO/IEC JTC/SC 29, ISO/IEC 23009-1:2012, No. N12329, XP030018824, Jan. 6, 2013, 127 pages.

"Using a Manifest XML File to Convey SCTE 35 Messaging Information Through the Use of an Alternative Video/Audio View Mechanism," PriorArtDatabase, Technical Disclosure, Sep. 28, 2010, 3 pages.

Stockhammer, T., et al., "Event Signalling in Dash," International Organisation for Standardisation, ISO/IEC JTC1/SC29/WG11, Coding of Moving Pictures and Audio, ISO/IEC JTC1/SC29/WG11, MPEG2010/M25232, Apr. 2012, 7 pages.

Foreign Communication From a Counterpart Application, European Application No. 13762314.6, Extended European Search Report dated Mar. 29, 2016, 6 pages.

Foreign Communication From a Counterpart Application, Korean Application No. 10-2015-7006123, Korean Office Action dated Jan. 22, 2016, 7 pages.

Foreign Communication From a Counterpart Application, Korean Application No. 10-2015-7006123, English Translation of Korean Office Action dated Jan. 22, 2016, 4 pages.

Partial English Translation and Abstract of Japanese Patent Application No. JPA2000504181, Mar. 11, 2016, 49 pages.

Partial English Translation and Abstract of Japanese Patent Application No. JPA2006528440, Mar. 11, 2016, 39 pages.

Partial English Translation and Abstract of Japanese Patent Application No. JPA2010093831, Mar. 11, 2016, 54 pages.

Partial English Translation and Abstract of Japanese Patent Application No. JPA2013511196, Mar. 11, 2016, 78 pages.

Foreign Communication From a Counterpart Application, Japanese Application No. 2015-528663, Japanese Office Action dated Mar. 1, 2016, 3 pages.

Foreign Communication From a Counterpart Application, Japanese Application No. 2015-528663, English Translation of Japanese Office Action dated Mar. 1, 2016, 3 pages.

"Series J: Cable Networks and Transmission of Television, Sound Programme and Other Multimedia Signals, Digital transmission of television signals, Digital program insertion cueing message for cable television systems," ITU-T, U.181, Jun. 2004, 32 pages.

Foreign Communication From a Counterpart Application, European Application No. 13762314.6, European Summons to attend Oral Proceedings dated Oct. 27, 2016, 7 pages.

* cited by examiner

```
// drop all packets prior to the beginning of the box
            while ( 1 )
            {
               transport_packet = read_transport_packet();
               if ( transport_packet.PID == 0x04
                    && transport_packet.payload_unit_start_indicator
                              && ( transport_packet.adaptation_field_control & 0x01 ) )
                         break;
            } bytes_read = 0;

while ( 1 )
            {
               transport_packet = read_transport_packet();
               payload_size = 188 - 4;

if ( transport_packet.PID != 0x04 ) continue;
    if ( transport_packet.adaptation_field_control == 0x02 ) continue;
               if ( transport_packet.payload_unit_start_indicator == 1 )
               {
                  if ( bytes_read == 0 )
                         {
                              // read a fixed header
                              packet_header = transport_packet.data_byte[0..3];
                                    payload_size -= 4;
                         }
                         else
                         {
                              break;
                         }
               } if ( transport_packet.adaptation_field_control == 0x03 )
                    payload_size -= transport_packet.adaptation_field_length + 1;
               }
               box_buffer[bytes_read...bytes_read+payload_size-1] =
                    transport_packet.data_byte[0..payload_size-1];
    bytes_read += payload_size;
            }
// box_buffer now holds a complete box
```

CARRIAGE OF ISO-BMFF EVENT BOXES IN AN MPEG-2 TRANSPORT STREAM

CROSS-REFERENCE TO RELATED APPLICATIONS

The present application claims priority to U.S. Provisional Patent Application No. 61/692,099 filed Aug. 22, 2012 by Alexander Giladi and entitled "Carriage of ISO-BMFF Event Boxes in MPEG-2 TS", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may stream media contents to streaming clients, which may take the form of various user end devices, such as televisions, notebook computers, and mobile handsets. A media content may comprise a Media Presentation Description (MPD) and a plurality of media segments, which may be carried in a media stream. The MPD may be an extensible markup language (XML) file or document describing the media content, such as its various representations, Uniform Resource Locator (URL) addresses, and other characteristics. For example, the media content may comprise several media components (e.g. audio, video, and text), each of which may have different characteristics that are specified in the MPD. Each media component comprises a plurality of media segments containing the parts of actual media content, and the segments may be stored collectively in a single file or individually in multiple files. Each segment may contain a pre-defined byte size (e.g., 1,000 bytes) or an interval of playback time (e.g., 2 or 5 seconds) of the media content.

Media content may be delivered from a streaming server to a streaming client adaptively based on a variety of factors, such as network conditions, device capability, and user choice. Upon reception of the TS, the streaming client may parse the TS to extract information from within. Adaptive streaming technologies may include various technologies or standards implemented or being developed, such as Dynamic Adaptive Streaming over Hypertext Transfer Protocol (HTTP) (DASH), HTTP Live Streaming (HLS), Adaptive Transport Streaming (ATS), or Internet Information Services (IIS) Smooth Streaming.

For example, as one type of adaptive streaming, DASH has been defined by the International Organization for Standardization (ISO) and the International Electrotechnical Commission (IEC) in an international standard. The standard, usually identified as ISO/IEC 23009-1, is entitled "Information technology—Dynamic adaptive streaming over HTTP (DASH)—Part 1: Media presentation description and segment formats" and incorporated herein by reference. Recent amendments to the ISO/IEC 23009-1 have provided a way of transporting event messages (denoted as emsg) using an ISO-Base Media File Format (BMFF) box. The emsg box may be specific to ISO-BMFF media segments, and there may be no generic counterpart to the emsg event in the media segments of a transport stream (TS) defined by the Moving Picture Experts Group-2 (MPEG-2) standard. Consequently, adaptive streaming may not be conveniently delivered to user devices with MPEG-2 TS support.

SUMMARY

In one embodiment, the disclosure includes a method of media streaming implemented by a network device, the method comprising encapsulating a message box into one or more packets in a segment, and sending the segment directly or indirectly to a streaming client.

In another embodiment, the disclosure includes a network device comprising a processor configured to encapsulate a message box in one or more transport stream (TS) packets, generate a media segment comprising the one or more TS packets, and a transmitter coupled to the processor and configured to transmit the media segment.

In yet another embodiment, the disclosure includes an apparatus functioning as a streaming client and comprising a receiver configured to receive a TS comprising a plurality of packets, wherein one or more of the packets comprises an event message box encapsulated therein, and a processor coupled to the receiver and configured to extract the event message box by parsing the one or more packets.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The Society of Cable Telecommunications Engineers (SCTE) has defined a standard that can be used for adding event messaging to a media stream. The standard is referred to as SCTE 35 entitled "Digital Program Insertion Cueing Message for Cable." The standard may use a relatively complex and rich structure of messages related to dynamic advertisement (in short as ad) insertion (e.g. marking the boundaries of ad breaks), request to add ads, and schedule change notification (e.g. program interruption or overrun).

However, several issues may arise from the use of SCTE 35 in a Dynamic Adaptive Streaming over Hypertext Transfer Protocol (HTTP) (DASH) client. For example, firstly the DASH client may need to be able to parse SCTE 35 commands, which in addition to SCTE 35 stack, may also imply parsing MPEG-2 TS headers and Program Specific Information (PSI). Secondly, SCTE 35 has its own conditional access model that may need to be supported, which may add complexity to the implementation in a DASH client. Thus, while SCTE 35 support may be ubiquitous on the server-side in cable headends, where ad insertion may often be done, SCTE 35 support may be virtually non-existent on the client side. Thirdly, extensibility may be a potential issue, as SCTE 35 has pre-defined events and may have a more generalized form of events. For example, a SCTE 35-defined event may have its length limited to 253 bytes. This size limit may not be sufficient to carry a generic emsg box. Sometimes, even a Media Presentation Description (MPD) Uniform Resource Locator (URL) may exceed this limit.

It is possible to create a new descriptor in SCTE 35, however the size limit may then become 4K (kilo) bytes. This size limit may be enough for some cases, but it is still possible to have larger boxes, e.g., if part of an MPD is embedded within a box. Another potential problem may be that adding a new descriptor may need a new implementation. Furthermore, it is desirable to make the event mechanism as similar as possible for both MPEG-2 TS and ISO-BMFF media segments. A minimal amount of implementation on the DASH client side is desired.

The present disclosure teaches an alternative solution in which a message box, such as an emsg box, may be encapsulated or packetized into one or more packets. The one or more packets may be contained in a media segment. Further, all of the packets carrying a message box may be configured to have a fixed packet identifier (PID) value, e.g., a 13-bit value of 0x0004 which is reserved by MPEG-2 for adaptive streaming. The first packet encapsulating a message box may comprise a packet header indicating the start of the encapsulation and a packet payload containing a header of the message box. In addition, the last packet may have an adaptation field padded with one or more stuffing bytes. On the other end, to identify and extract an event message box from media segments of a received TS, a streaming client may parse the packet header of one or more packets. The streaming client may skip an adaptation field if necessary. Overall, the embodiments taught herein may maximize code reuse for DASH clients.

Figure 1:
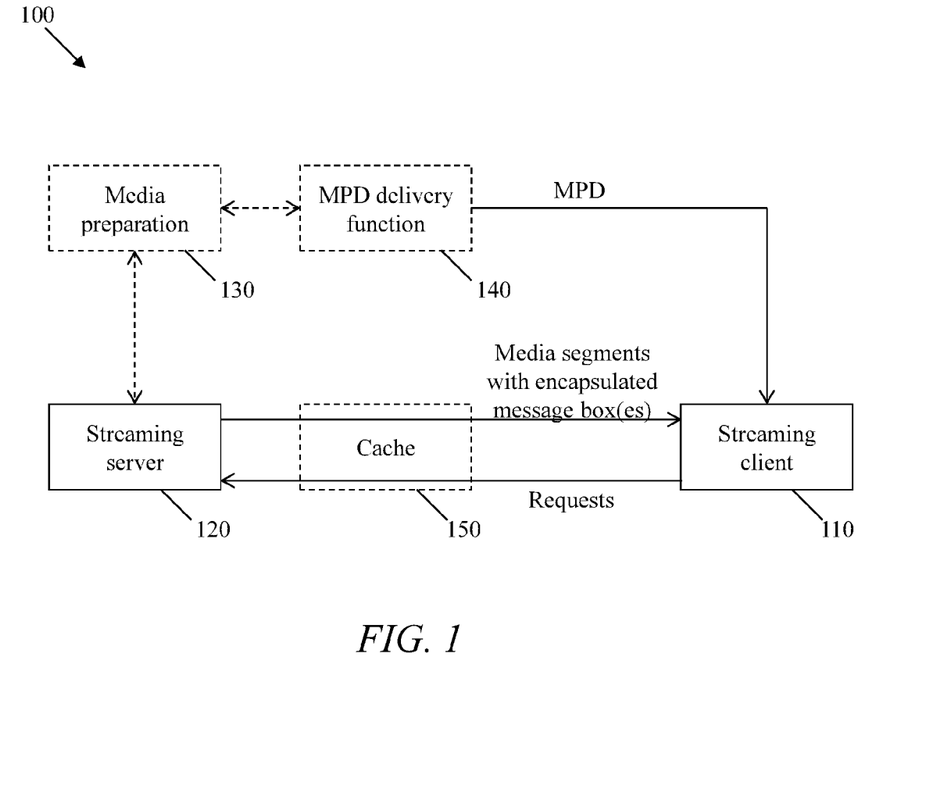
FIG. 1 illustrates an embodiment of a media streaming architecture.

FIG. 1 illustrates an embodiment of a media streaming architecture 100, which may be implemented to deliver media content from a streaming server or provider 120 to a streaming client 110. For example, the streaming architecture 100 may involve a DASH, MPEG-2 TS, or other type of streaming scheme. The streaming client 110 may be a program or application implemented in an operating system of a user device, or it may be a web client accessed in a web platform. The streaming client 110 may be implemented in any user device, such as a mobile phone, notebook, computer, television, etc. If DASH is used, the streaming client 110 is a DASH client, and the streaming server may be an HTTP server or proxy.

The media content stored in the streaming server 120 may be generated or prepared by a streaming media preparation unit 130. The media preparation unit 130 may be located in the streaming server 120 or elsewhere (e.g., in a content provider). The streaming server 120 may be part of a content provider or may be a node in a content distribution network (CDN). For example, the streaming server 120 may be an edge node in a CDN, and may work as the last hop from a content provider to the streaming client 110. The media content may be generated by the content provider and then transmitted to a CDN node. The media content in the streaming server 120 may comprise a MPD and a plurality of segments. Note that, if desired, the MPD and the segments may be stored in different servers and sent to the streaming client 110 from different servers. In addition, a streaming server described herein merely serves as an example of a server, it should be understood that thus embodiments disclosed herein may also be implemented in any other suitable type of server.

The streaming client 110 may send a request to the streaming server 120 for media content. In response, the streaming server 120 may first use a MPD delivery function 140 to deliver a MPD to the streaming client 110. The MPD can be delivered using HTTP, email, thumb drive, broadcast, or any other transport. By parsing the MPD, the streaming client 110 may learn information regarding the media content, such as the timing of the program, the availability of media content, the media types, resolutions, minimum and maximum bandwidths, the existence of various encoded alternatives of multimedia components, the accessibility features and the required digital right management (DRM), the location of each media component on the network, and other characteristic of the media content. Using this information, the streaming client 110 may select the appropriate encoded representation or alternative and start streaming the media content by fetching media segments, e.g., following the MPEG-2 TS standard.

The streaming server 120 may use a segment delivery function to deliver a media segment to the streaming client 110. A media segment may comprise one or more TS packets, in which at least one message box (e.g., emsg box) is encapsulated. Note that the streaming client 110 may download segments from a plurality of streaming servers, e.g., to maximize usage of network bandwidth. The streaming client 110 may render the downloaded media appropriately so as to provide streaming service to a user of the streaming client 110. Although the streaming client 110 may obtain the segments based on locations specified by URLs contained in the MPD, sometimes the segment may be stored in an HTTP cache 150 (e.g., in the streaming server 120), so that the streaming client 110 may receive them more efficiently.

Figure 2:
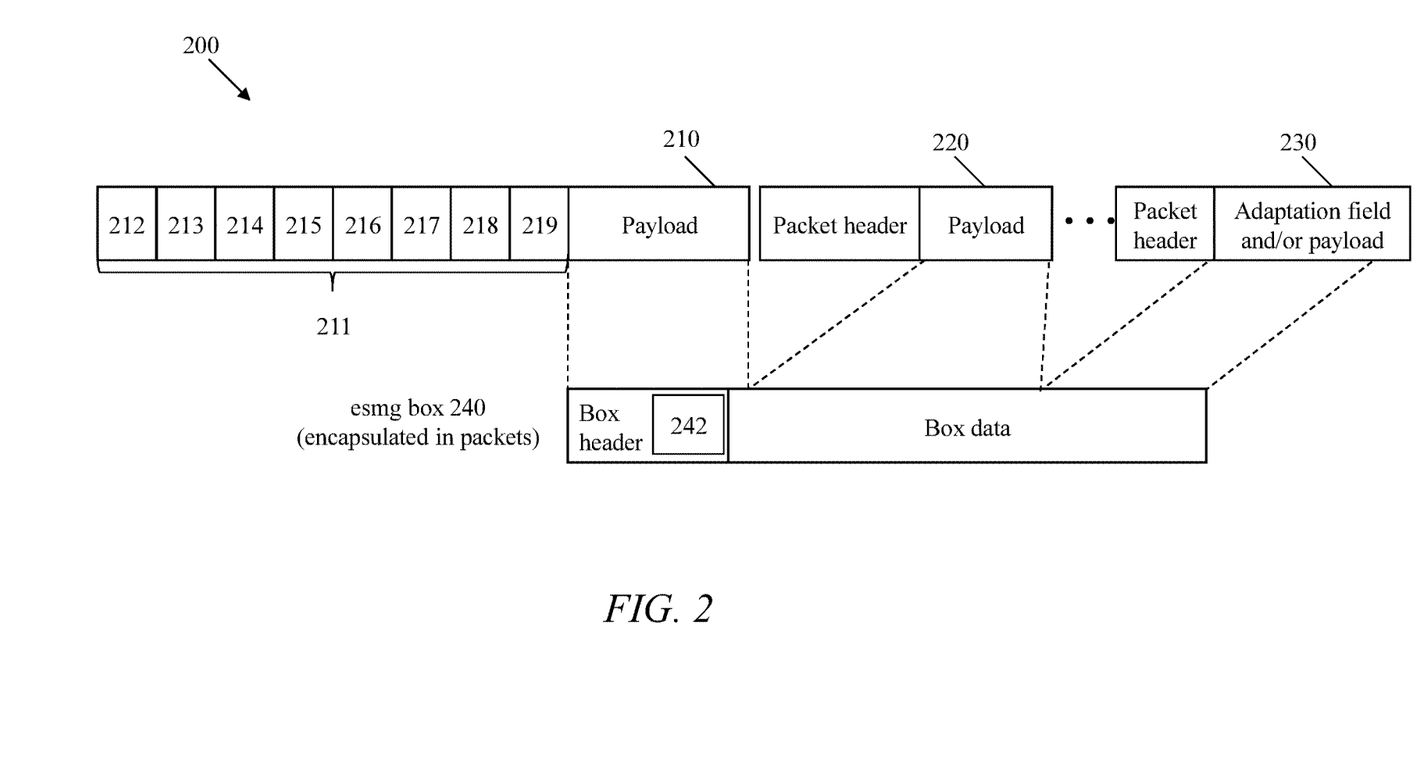
FIG. 2 illustrates an embodiment of a media segment comprising packets.

FIG. 2 illustrates an embodiment of a media segment 200, which may be a valid TS that is communicated from a streaming provider to a streaming client. If sub-segments are used in the media segment 200, embodiments described herein may apply to the sub-segment just as they apply to a segment.

The segment 200 may comprise a plurality of TS packets, and one or more of the packets may be used to encapsulate a message box. That is, one message box may be encapsulated using one packet, or using a plurality of packets (which may or may not be consecutive). The number of packets used in encapsulating a message box may depend on factors such as the size of the message box. As messages are transported in unit of boxes, the messages may be referred hereafter also as message boxes. As an example, packets 210, 220, and 230 shown in FIG. 2 are used in the encapsulation of an event message (emsg) box 240. Although emsg is used as an exemplary message to demonstrate the principle of box encapsulation or packetization, a person of ordinary skill in the art will recognize that the principles disclosed herein will apply to any other suitable type of event message box or general message box.

A message box (e.g., an ISO-BMFF box) may carry a message, such as an event message, EventMessageBox (emsg), in a box format (e.g., defined by DASH). The emsg box may be a generic event box, and its payload may be application-defined. In the DASH standard, for example, an emsg box may provide signaling for generic events related to the media presentation time. The semantics of the emsg box may follow those for MPD events, and the emsg box may also provide signaling specific for DASH operations. A media segment if encapsulated in ISO BMFF may contain one or more packetized emsg boxes. If present, any emsg box may be placed before any 'moot' box which may also be encapsulated if desired. A message box may be used for various purposes such as notifying a streaming client that it should refresh an MPD (standardized in an amendment to DASH), providing a patch to apply to the MPD, and/or providing information on upcoming ads (such as SCTE 35, Interactive Advertising Bureau (IAB) Video Ad Serving Template (VAST), and/or IAB Video Multiple Ad Playlist (VMAP)). Further details on example embodiments of event message box can be found in Section 5.10.3.3 of the amendment to the DASH standard. The amendment document is identified as ISO/IEC 23009-1:2012/Amd.1:2013 (E), entitled "Information technology—Dynamic adaptive streaming over HTTP (DASH)—Part 1: Media presentation description and segment formats, AMENDMENT 1," and incorporated herein by reference.

Each of the TS packets 210, 220, and 230 may have a fixed length, e.g., of 188 bytes. The 188-byte length is highly compatible with the length Asynchronous Transfer Mode (ATM) cells, and commonly used in MPEG-2 TS segments because of its applicability to efficient and robust error-correction coding. The packet 210, as an exemplary packet, may comprise a packet header 211. The packet header may comprise various fields including a synchronization field 212, a transport error indicator 213, a payload-unit start indicator 214 (denoted as payload_unit_start_indicator), a transport priority field 215, a PID 216, a transport-scrambling control field 217, an adaptation field control flag (denoted as adaptation_field_control) 218, and a continuity index 219. The packet header and its fields may be configured to have any suitable size. In an embodiment, the packet header 211 has a fixed length of 4 bytes (i.e., 32 bits), with an 8-bit synchronization field 212, an 1-bit transport error indicator 213, an 1-bit payload-unit start indicator 214, an 1-bit transport priority field 215, a 13-bit PID 216, a 2-bit transport-scrambling control field 217, a 2-bit adaptation field control flag 218, and a 4-bit continuity index 219.

The adaptation field control flag in a packet header may indicate the existence of an adaptation field, or a payload, or both following the header. For example, adaptation_field_control='01' may indicate that a payload follows the header, adaptation_field_control='10' may indicate that an adaptation field follows the header, and adaptation_field_control='11' may indicate that an adaptation field and a payload both follow the header.

The PID in a packet header may identify different types of packets, e.g., about 8000 types may be identified using a 13-bit field. As TS packets with a PID value of 0x0004 (0x indicates a hexadecimal value) may be especially reserved for adaptive streaming messages, according to an embodiment, each packet encapsulating at least part of an emsg box may be given a PID of 0x0004. In addition, the payload-unit start indicator in the packet header may indicate the start of a payload unit, e.g., a single file-level message box. The transport-scrambling control field may indicate whether the payload section is scrambled, and a continuity index may be used for detecting packet discontinuity.

A media segment may be a MPEG-2 TS, and may contain one or more event message ('emsg') boxes encapsulated into TS packets. In an embodiment, one or more TS packets carrying an emsg box 240 may use a reserved or fixed PID value of 0x0004. A TS packet carrying the start (box header) of the emsg box may have the payload_unit_start indicator field turned on (e.g., set to '1'). The packet payload may start from the beginning of the emsg box 240. A complete box type field 242, denoted as Box.type may need to be present in this first packet, and the payload size may be at least 4 bytes. The box type field 242 may be part of the header of the emsg box 240, and may be used to indicate that the box is an emsg box. Note that neither sections nor packetized elementary stream (PES) packets may be used in encapsulating or carrying message boxes.

The packet payload may start from the beginning of a message box (box header), or from a fixed N-byte header followed by a box header. The N-byte header may provide additional information (e.g., a checksum or cryptographic hash to verify box integrity) or indicate availability of such information following the end of the box. Both headers may be present in the first packet, thus the size of the adaptation field may be 182-N-8 bytes at most. The continuation of box data may occupy following TS packets with the same PID. The packets comprising the message box encapsulated therein may be detected or identified, e.g., by a streaming client, as the packets contain the same PID. The last packet carrying the end of the box may be padded using adaptation field stuffing bytes. The stuffing bytes may have random or pre-set values (e.g., a stuffing byte can be set as a fixed 8-bit value equal to 255). Stuffing bytes may be inserted by an encoder or any in-network device, such as multiplexer, packager, etc, and then discarded by a decoder. An additional "footer" may be placed after the end of the box. For any packet with a PID value of 0x0004, the value of the transport_scrambling_control field may be set to '00' to indicate that no scrambling is used on the payload section.

Note that a segment may contain one or more complete message boxes (e.g., the entirety of the emsg box 240). A streaming client may detect whether a message box is complete by inspecting the header of the box, which comprises the size of the box. Further, if the field of @bitstream-Switching is set, and subsegments are used, a subsegment may contain one or more complete emsg boxes. Note that a bitstream switching segment, if present, may contain essential data to switch to a representation the segment is assigned to. For example, the field of @bitstreamSwitching being set to "true" in the bitstream switching segment may indicate that the segment concatenation is a valid TS (e.g., an MPEG-2 TS).

The solution of carrying event boxes in MPEG-2 TS packets as taught may be a generic solution. Since there is no limit on box size imposed by MPEG-2 Systems standard, any box length can be used, while the box size may be given in a box header. Moreover, the encapsulation of an emsg box may be extended, with trivial complexity, for any other box for which direct MPEG-2 TS transport is deemed necessary. Moreover, it should be understood that any ISO-BMFF box or other type(s) of message box may be used with the embodiments described herein. Moreover, any data using a box syntax can be accommodated.

Another benefit of the embodiments described herein may be the commonality with ISO-BMFF, as it is possible to use a derivation procedure for the emsg box, and then embed the emsg into any segment format. Moreover, this disclosure may allow the use of TS-based event-only adaptation set(s) in the same period as ISO-BMFF adaptation set(s) (denoted as AdaptationSet) elements. For example, this disclosure may allow passing ad-related metadata beyond SCTE 35, and allow indication of MPD expiration for TS-based clients. Beyond DASH, the embodiments disclosed herein may be used in any system in which media is encapsulated into MPEG-2 TS packets.

Figure 3:
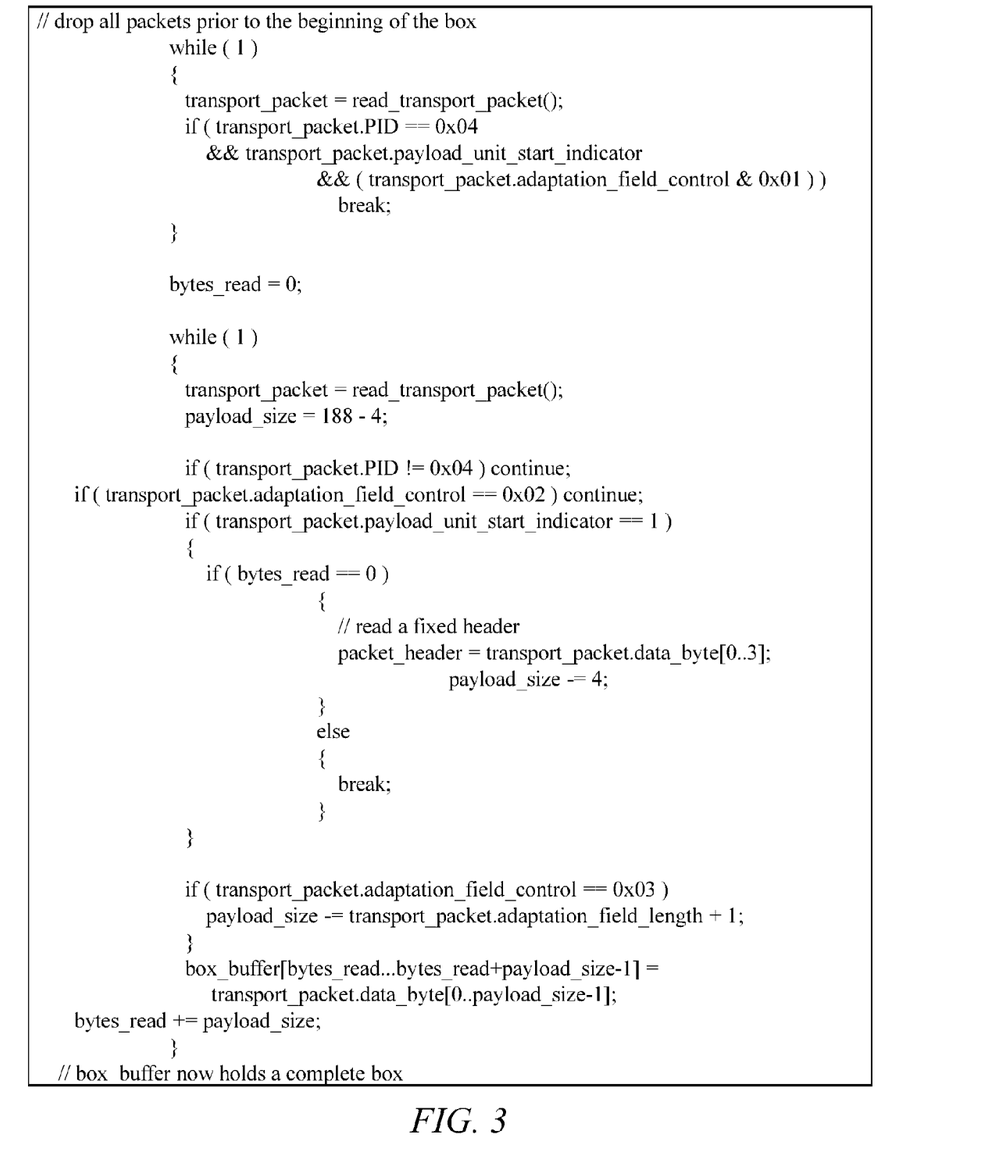
FIG. 3 illustrates a section of exemplary pseudo codes for box extraction by a streaming client.

A streaming provider or server may send, directly or indirectly to a streaming client, a TS comprising media segments. In one media segment, one or more packets may contain at least one message box encapsulated therein. On the streaming client's end, the TS may be received, and the message boxes may be extracted from the media segment via parsing. FIG. 3 illustrates a section of exemplary pseudo codes for box extraction by the streaming client. The pseudo codes in FIG. 3 may enable one of ordinary skill in the art to drop packets prior to the start of a message box as well as stuffing bytes, and thereby generate a complete message box. The streaming client may detect whether a complete message box is encapsulated in TS packets by parsing the PID of the packets. If one or more packets have the reserved PID value of 0x0004, it may indicate that at least one message box is encapsulated. The computational complexity involved in detecting packet headers may be trivial, unless the media segment is fully encrypted.

Also, note that, to perform event extraction, only complete boxes may be present within a segment. A logic and (AND) operation is used in the pseudo codes to find the packetized emsg box. Note that since the adaptation field control flag may be set to different values (e.g., '01', '10', or '11'), the streaming client may skip the adaptation field when necessary.

Timing data may be needed in order to simplify the calculation of the event presentation time on the client side. In an embodiment, a field contained in a box header and denoted as emsg.presentation_time_delta may be relative to the earliest presentation time of the segment. While a DASH client may know the earliest presentation time of a segment, MPEG-2 TS may lack this information, thus having an optional pts_offset field in the header may assist in processing the event within a user equipment that is unaware of the emsg.presentation_time_delta.

Figure 4:
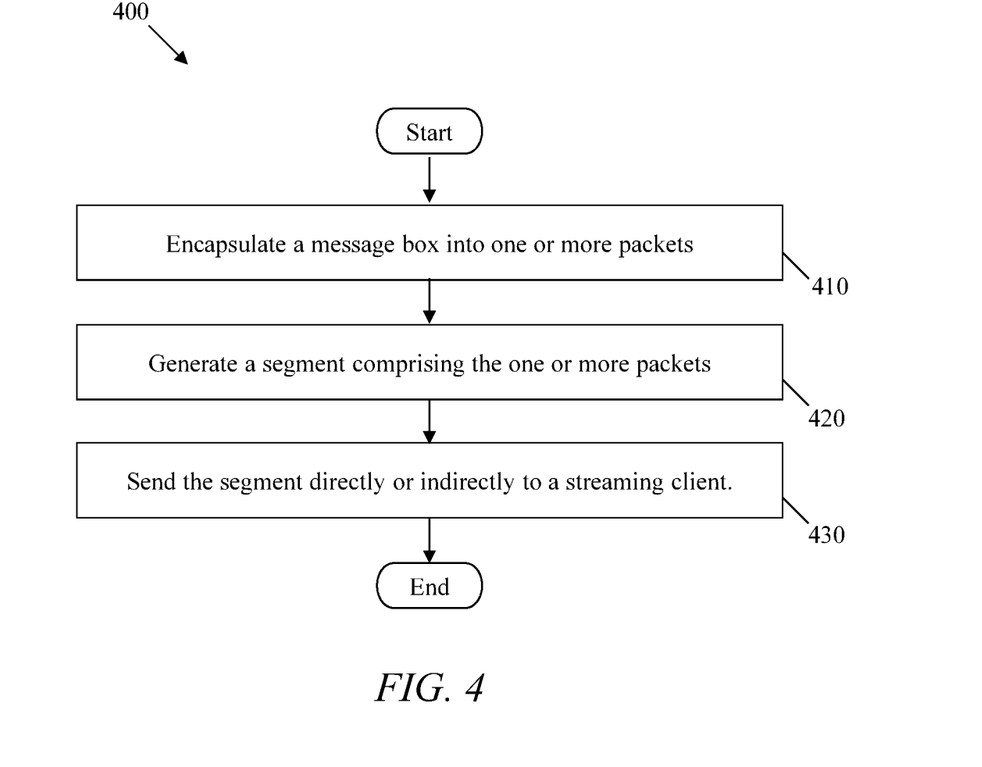
FIG. 4 illustrates an embodiment of a media streaming method.

FIG. 4 illustrates an embodiment of a media streaming method 400, which may be implemented by a streaming server (e.g., the streaming server 120). The method 400 starts in step 410, in which the streaming server may encapsulate a message box into one or more packets. In an embodiment, the message box is an emsg box specific for DASH, and the packets are specific for MPEG-2. As a result of encapsulation, the message (e.g., event message) box is packetized and contained in one or more packets. In step 420, the method 400 may generate a segment (e.g., a media segment) comprising the one or more packets. In step 430, the method may send the segment, directly or indirectly to a streaming client, wherein the segment comprises the one or more packets in which the message box is encapsulated.

It should be understood that variations of the method 400 exist and is encompassed by principles disclosed herein. For example, if the streaming server is a CDN edge node that receives already-prepared transport streams, the encapsulation of the message box and the generation of the segment may be done by a different device, e.g., by a content provider during content preparation. In this case, only a portion of the steps in the method 400 is implemented in the streaming server. For another example, other steps, such as transcoding, encryption, decryption of the segment may be incorporated into the method 400, wherever appropriate, to facilitate the media streaming service.

Figure 5:
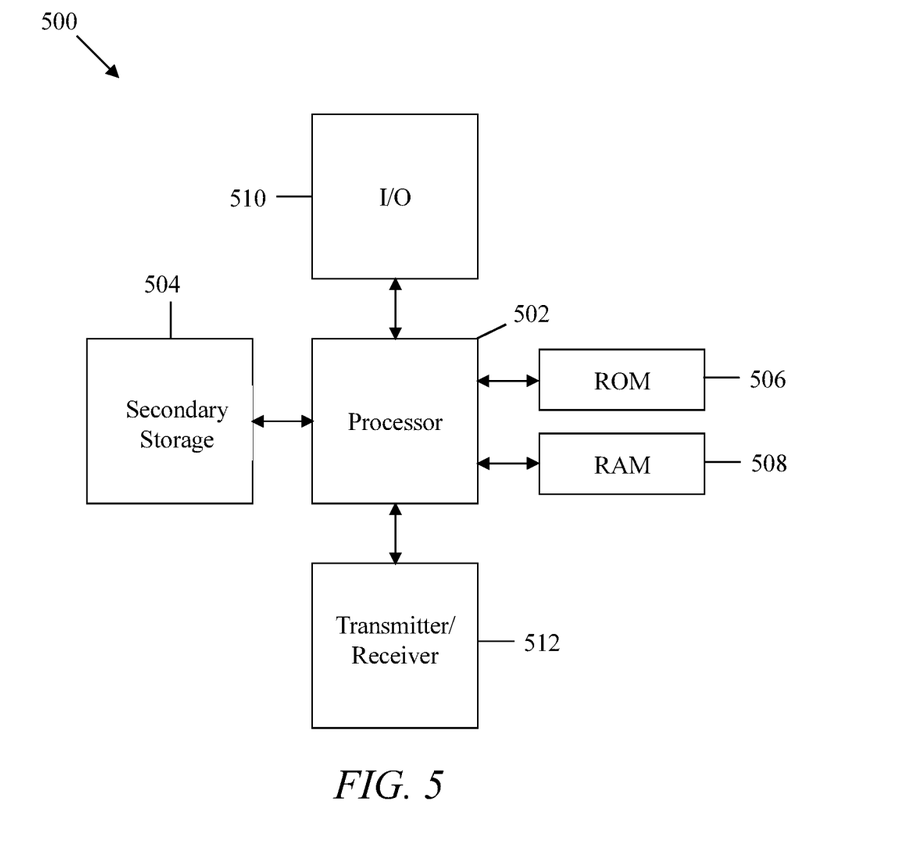
FIG. 5 illustrates an embodiment of a network device.

The schemes described above may be implemented on a network component or node, such as a network node with sufficient processing power, memory resources, and network throughput capability to handle the necessary workload placed upon it. FIG. 5 illustrates an embodiment of a network node or device 500 suitable for implementing one or more embodiments of the methods/schemes disclosed herein, such as the media streaming method 400. Further, the network device 500 may be configured to implement any of the apparatuses described herein, such as the streaming client 110 or the streaming server 120.

The network device 500 includes a processor 502 that is in communication with memory devices including secondary storage 504, read only memory (ROM) 506, random access memory (RAM) 508, input/output (I/O) devices 510, and transmitter/receiver 512. Although illustrated as a single processor, the processor 502 is not so limited and may comprise multiple processors. The processor 502 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 502 may be configured to implement any of the schemes described herein, including the media streaming method 400. The processor 502 may be implemented using hardware or a combination of hardware and software.

The secondary storage 504 is typically comprised of one or more disk drives or tape drives and is used for non-volatile storage of data and as an over-flow data storage device if the RAM 508 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504. The RAM 508 is used to store volatile data and perhaps to store instructions. Access to both the ROM 506 and the RAM 508 is typically faster than to the secondary storage 504.

The transmitter/receiver 512 may serve as an output and/or input device of the network device 500. For example, if the transmitter/receiver 512 is acting as a transmitter, it may transmit data out of the network device 500. If the transmitter/receiver 512 is acting as a receiver, it may receive data into the network device 500. The transmitter/receiver 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 512 may enable the processor 502 to communicate with an Internet or one or more intranets. The I/O devices 510 may include a video monitor, liquid crystal display (LCD), touch screen display, or other type of video display for displaying video, and may also include a video recording device for capturing video. I/O devices 510 may also include one or more keyboards, mice, or track balls, or other well-known input devices.

It is understood that by programming and/or loading executable instructions onto the network device 500, at least one of the processor 502, the secondary storage 504, the RAM 508, and the ROM 506 are changed, transforming the network device 500 in part into a particular machine or apparatus (e.g., a streaming server or client having the novel functionality taught by the present disclosure). The executable instructions may be stored on the secondary storage 504, the ROM 506, and/or the RAM 508 and loaded into the processor 502 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of media streaming implemented by a network device, the method comprising:
    encapsulating a first portion of an event message box into a first transport stream (TS) packet in a segment, wherein the first TS packet comprises a packet identifier (PID) value, wherein the event message box is in a format defined by Dynamic Adaptive Streaming over Hypertext Transfer Protocol (HTTP) (DASH), wherein the first TS packet comprises a packet header and a packet payload, wherein the packet header comprises a payload-unit start indicator indicating that the event message box starts in the first TS packet, and wherein the packet payload comprises a box header of the event message box;
    encapsulating a second portion of the event message box into a second TS packet in the segment, wherein the second TS packet comprises the PID value; and
    sending the segment comprising the first TS packet and the second TS packet to a client.

2. The method of claim 1, wherein the PID value is for adaptive streaming.

3. The method of claim 1, wherein the PID value is 4.

4. The method of claim 1, wherein the PID value is 13-bit reserved value of 0x0004 .

5. The method of claim 1, wherein the payload-unit start indicator has a 1-bit value of '1', and wherein a size of the packet payload is at least 4 bytes.

6. The method of claim 1, wherein a TS packet carrying an end of the event message box comprises an adaptation field padded with stuffing bytes, wherein the adaptation field indicates the end of the end event message box, and wherein padding of the stuffing bytes is based on an adaptation field control flag contained in a packet header of the TX packet carrying the end of the event message box.

7. The method of claim 1, wherein the segment includes a bitstream switching field to indicate the event message box is complete.

8. The method of claim 1, wherein the segment includes a bitstream switching field to indicate the event message box is incomplete.

9. The method of claim 1, wherein each of first and second TS packets is 188 bytes in size and comprises a packet header with a fixed size of 4 bytes, and wherein the packet header comprises a 8-bit synchronization field, a 1-bit transport error indicator, a 1-bit payload-unit start indicator, a 1-bit transport priority field, a 13-bit packet identifier (PID), a 2-bit transport-scrambling control field, a 2-bit adaptation field control flag, and a 4-bit continuity index.

10. A network device, comprising:
a processor; and
a computer readable storage medium storing programming for execution by the processor, the programming including instructions to:
encapsulate a first portion of an event message box into a first transport stream (TS) packet in a segment, wherein the first TS packet comprises a packet identifier (PID) value, wherein the event message box is in a format defined by Dynamic Adaptive Streaming over Hypertext Transfer Protocol (HTTP) (DASH), wherein the first TS packet comprises a packet header and a packet payload, wherein the packet header comprises a payload-unit start indicator indicating that the event message box starts in the first TS packet, and wherein the packet payload comprises a box header of the event message box;
encapsulate a second portion of the event message box into a second TS packet in the segment, wherein the second TS packet comprises the PID value; and
send the segment comprising the first TS packet and the second TS packet to a client.

11. The network device of claim 10, wherein the PID value is for adaptive streaming.

12. The network device of claim 10, wherein the PID value is 4.

13. The network device of claim 10, wherein the PID value is 13-bit reserved value of 0x0004.

14. The network device of claim 10, wherein the payload-unit start indicator has a 1-bit value of '1', and wherein a size of the packet payload is at least 4 bytes.

15. The network device of claim 10, wherein a TS packet carrying an end of the event message box comprises an adaptation field padded with stuffing bytes, wherein the adaptation field indicates the end of the event message box, and wherein padding of the stuffing bytes is based on an adaptation field control flag contained in a packet header of the TS packet carrying the end of the event message box.

16. The network device of claim 10, wherein the segment includes a bitstream switching field to indicate the event message box is complete.

17. The network device of claim 10, wherein the segment includes a bitstream switching field to indicate the event message box is incomplete.

18. The network device of claim 10, wherein each of first and second TS packets is 188 bytes in size and comprises a packet header with a fixed size of 4 bytes, and wherein the packet header comprises a 8-bit synchronization field, a 1-bit transport error indicator, a 1-bit payload-unit start indicator, a 1-bit transport priority field, a 13-bit packet identifier (PID), a 2-bit transport-scrambling control field, a 2-bit adaptation field control flag, and a 4-bit continuity index.

* * * * *